US011665376B2

(12) United States Patent
Melanson

(10) Patent No.: US 11,665,376 B2
(45) Date of Patent: *May 30, 2023

(54) SYSTEMS AND METHODS FOR SHARING VIDEO DATA VIA SOCIAL MEDIA

(71) Applicant: Bruce Melanson, Valrico, FL (US)

(72) Inventor: Bruce Melanson, Valrico, FL (US)

(73) Assignee: Bruce Melanson, Valrico, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,587

(22) Filed: Aug. 22, 2022

(65) Prior Publication Data

US 2022/0400296 A1 Dec. 15, 2022

Related U.S. Application Data

(63) Continuation of application No. 17/404,140, filed on Aug. 17, 2021, now Pat. No. 11,457,246, which is a continuation of application No. 17/062,750, filed on Oct. 5, 2020, now Pat. No. 11,115,685, which is a continuation of application No. 16/511,398, filed on Jul. 15, 2019, now Pat. No. 10,798,426, which is a
(Continued)

(51) Int. Cl.
| | |
|---|---|
| *H04N 21/2187* | (2011.01) |
| *H04N 21/81* | (2011.01) |
| *H04N 21/258* | (2011.01) |
| *H04N 21/2668* | (2011.01) |
| *H04N 21/414* | (2011.01) |
| *H04N 21/4788* | (2011.01) |
| *H04N 21/41* | (2011.01) |
| *H04L 67/53* | (2022.01) |
| *H04L 67/10* | (2022.01) |

(52) U.S. Cl.
CPC ........ *H04N 21/2187* (2013.01); *H04L 67/10* (2013.01); *H04L 67/53* (2022.05); *H04N 21/25841* (2013.01); *H04N 21/25883* (2013.01); *H04N 21/2668* (2013.01); *H04N 21/4126* (2013.01); *H04N 21/41415* (2013.01); *H04N 21/4788* (2013.01); *H04N 21/812* (2013.01)

(58) Field of Classification Search
CPC ........ H04N 21/2187; H04N 21/25841; H04N 21/25883; H04N 21/2668; H04N 21/4126; H04N 21/41415; H04N 21/4788; H04N 21/812; H04L 67/10; H04L 67/53
See application file for complete search history.

(56) References Cited

U.S. PATENT DOCUMENTS

| | | | |
|---|---|---|---|
| 2012/0096357 A1* | 4/2012 | Folgner | G06F 3/04842 715/726 |
| 2014/0258405 A1* | 9/2014 | Perkin | H04W 4/21 709/204 |

(Continued)

*Primary Examiner* — Kunal Langhnoja
(74) *Attorney, Agent, or Firm* — Shumaker, Loop & Kendrick, LLP

(57) ABSTRACT

Disclosed are efficient and user-friendly systems or methods configured to capture and share video data in real time, at a later date, or a combination thereof in an authorized manner via social media. In certain aspects, these systems and methods include capturing video, for example, from a "Jumbotron" during a sporting event or other live venue event in an authorized manner (e.g., abiding by applicable copyright laws) and sharing this captured footage with other via social media.

7 Claims, 7 Drawing Sheets

Related U.S. Application Data continuation of application No. 15/946,974, filed on Apr. 6, 2018, now Pat. No. 10,382,796, which is a continuation of application No. 15/630,043, filed on Jun. 22, 2017, now Pat. No. 9,967,596, which is a continuation of application No. 15/211,665, filed on Jul. 15, 2016, now Pat. No. 9,723,334, which is a continuation of application No. 14/740,350, filed on Jun. 16, 2015, now Pat. No. 9,420,315.

(60) Provisional application No. 62/013,525, filed on Jun. 17, 2014.

(56) References Cited

U.S. PATENT DOCUMENTS

| | | | |
|---|---|---|---|
| 2014/0282001 A1* | 9/2014 | Lau | G06F 3/0488 715/723 |
| 2014/0363141 A1* | 12/2014 | Bonhomme | G11B 27/031 386/278 |
| 2015/0156543 A1* | 6/2015 | Allegretti | H04N 21/854 725/12 |
| 2015/0172748 A1* | 6/2015 | Navarro | H04N 21/44222 725/41 |
| 2015/0347827 A1* | 12/2015 | Dickinson | H04N 23/58 382/103 |

* cited by examiner

300

301

| Personal | Answer Type |
|---|---|
| First Name | Text Field |
| Last Name | Text Field |
| Middle Initial | Text Field |
| Email Address | Text Field |
| Confirm Email Address | Text Field |
| Password | Text Field [Encrypted] |
| Confirm Password | Text Field [Encrypted] |
| Age Range | Drop Down [Values] |
| Date of Birth | Data Field |

| Demographic Information | Answer Type |
|---|---|
| Address | Text Field |
| Address 2 | Text Field |
| City | Text Field |
| State | Drop Down [Values] |
| Zipcode | Numeric |
| Country | Text Field |
| Nationality | Drop Down [Values] |
| Race (Optional) | Drop Down [Values] |

| Profile Questions | Answer Type |
|---|---|
| What are Your Favorite Sports? | List |
| Who are Your Favorite Teams? | Text Box(s) |
| Which of Amy of These Sports Venue(s) Do You Attend? | List Based on Zipcode of Approved Trontastic Venues |
| How Often Do You Attend A Team Event? | Values |
| If Your Venue is Not Listed Please Enter It Here | Text Field |
| Do You Attend Musical Events? | Yes/No |
| Do You Attend Concert Venues? | Yes/No |
| How Often Do You Attend Concerts? | Values |
| How Often Do You Use Discount Coupons At A Venue? | Values |
| Do You Participate in Sports? | Yes/No |
| Sports I Play | Values |
| Do You Shop Online? | Yes/No |
| Do You Shop On Your Mobile Device? | Yes/No |
| What Kinds of Music Do You Like? | Values |
| Who Are Your Favorite Artists/Bands/Performers? | Text Field |

| Opt In | |
|---|---|
| Trontastic can send targeted coupons and discounts to you for your favorite venues that you can use during a show or game | Yes/No |
| Would you like to receive targeted emails advising you of specials for only Trontastic members that you can redeem at your favorite businesses | Yes/No |
| Would you like to receive the Trontastic Newsletter that details news and facts about your favorite venues? | Yes/No |
| Trontastic uses Geo Locating Features in Your Mobile Device to Track Your Location and Can Share Your Location with other Trontastic Members at Your Venue. | Yes/No |
| Allow Trontastic Members At My Venue to interact with Me Via Trontastic? | Yes/No |

FIG. 3B

SYSTEMS AND METHODS FOR SHARING VIDEO DATA VIA SOCIAL MEDIA

CROSS-REFERENCE TO RELATED APPLICATION

This U.S. Non-Provisional Patent Application is a continuation of U.S. Non-Provisional patent application Ser. No. 17/404,140 filed on Aug. 17, 2021, which is a continuation of U.S. Non-Provisional patent application Ser. No. 17/062,750 filed on Oct. 5, 2020 (issued as U.S. Pat. No. 11,115,685 on Sep. 7, 2021), which is a Continuation of U.S. Non-Provisional patent application Ser. No. 16/511,398 filed on Jul. 15, 2019 (issued as U.S. Pat. No. 10,798,426 on Oct. 6, 2020), which is a Continuation of U.S. Non-Provisional patent application Ser. No. 15/946,974 filed on Apr. 6, 2018 (issued as U.S. Pat. No. 10,382,796 on Aug. 13, 2019), which is a continuation of U.S. Non-Provisional patent application Ser. No. 15/630,043 filed on Jun. 22, 2017 (issued as U.S. Pat. No. 9,967,596 on May 8, 2018), which is a continuation of U.S. Non-Provisional patent application Ser. No. 15/211,665 filed on Jul. 15, 2016 (issued as U.S. Pat. No. 9,723,334 on Aug. 1, 2017), which is a continuation of U.S., Non-Provisional patent application Ser. No. 14/740,350 filed on Jun. 16, 2015 (issued as U.S. Pat. No. 9,420,315 on Aug. 16, 2016), which claims priority from U.S. Provisional patent application Ser. No. 62/013,525 filed on Jun. 17, 2014, the contents of which are incorporated by reference herein for their entirety.

TECHNICAL FIELD

The present invention generally relates to the field of systems and methods for sharing video data via social media, and more particularly, to systems and methods for sharing video captured during live events, e.g., sporting events, concerts, etc., in real time, at a later desired date, or a combination thereof via desired social media networks.

BACKGROUND

Sporting events and other live venue events (e.g., concerts) are a huge pastime worldwide. Many people visit these events to spend time with family, friends, and loved ones for entertainment and to further enjoy the comradery and intimacy of such events. Often while attending these events, people purchase tangible items and mementos, including but not limited to, shirts, caps, compact discs, posters, etc., commemorating and further evidencing their attendance. However, in the digital age, sales of these tangible items and mementos have greatly decreased or become nearly non-existent.

In the digital age, new forms of digitized media, items, and mementos have become common place and quite popular, directly coinciding with the decreased popularity of the above-mentioned tangible items. In certain instances, these digitized items have displaced and serve as the only substitute for these tangible items. Although various digitized items have gained great popularity over the past decade, no efficient, user-friendly systems or methods currently exist that capture and share video data of these events in real time or at a later date via desired social media in an authorized manner.

BRIEF SUMMARY

Therefore, a need exists to provide efficient, user-friendly systems and methods that capture and share video data of these events in an authorized manner via social media. Accordingly, disclosed herein are efficient, user-friendly systems and methods that capture and share video data in real time, at a later desired date, or a combination thereof, in an authorized manner via social media. In certain aspects, these systems and methods include capturing video, for example, from a "Jumbotron" during a sporting event or other live venue event in an authorized manner (e.g., abiding by applicable copyright laws) and sharing this captured footage with others via social media (e.g., social media participating in the disclosed systems and methods, social media outside the disclosed systems and methods, or a combination thereof). These methods and systems advantageously allow a user to share video data of these events in real time or a at a later date in an authorized manner via desired social media thereby evidencing and commemorating event attendance while also allowing for friends, families, and others to share in this enjoyment. In certain aspects, this video data shared via social media may include targeted advertisements from, for example, vendors at the event, licensed outside vendors not present at the event, or a combination thereof.

Disclosed is a method for sharing video images via social media (e.g., in real time, at a later date, or a combination thereof) including: (a) identifying, by a processor in a first electronic device, a video image from a second electronic device being displayed at a live venue event, wherein the first and second electronic devices are different from each other; (b) capturing, by a processor, the video image being displayed at the live venue event from the second electronic device onto the processor of the first electronic device; and (c) sharing the captured the video of step (b) via social media. (e.g., in real time, at a later date, or a combination thereof).

In certain aspects, the method further includes storing the captured video image on the first electronic device at a temporal relation in between steps (b) and (c).

In certain aspects, the method further includes communicating the captured video image on the first electronic device to a third electronic device before step (c), wherein the third electronic device is different than the first and second electronic devices.

In certain aspects, the method further includes communicating the captured video image on the first electronic device to a third electronic device after step (b) but before step (c), wherein the third electronic device is different than the first and second electronic devices.

In certain aspects, the third electronic device shares the captured video of step (c) with a fourth electronic device that shares the video via social media in real time, at a later date, or a combination thereof, wherein the fourth electronic device is different than the first, second, and third electronic devices.

In certain aspects, additional digital content is added in real time to the video of step (c).

In certain aspects, the additional digital content is at least one advertisement embedded within the captured video image. For example, the advertisement(s) may include targeted advertisements from, for example, vendors at the event, licensed outside vendors participating in the disclosed methods and systems not at the event, or a combination thereof.

In certain aspects, the first electronic device is a computing device with multi-threading processors, preferably having broadband connectivity. In certain aspects, the second device may include, but is not limited to, an oversized display screen (e.g., a "Jumbotron"), a transmitting and receiving device near, on, or in the oversized display screen configured to transmit and receive signals from any of the other devices disclosed herein. In certain aspects, the third electronic device is a user's peripheral device selected from the group consisting of a smartphone, a laptop, and a personal digital assistant.

Also disclosed is a system for sharing video images via social media (e.g., in real time, at a later date, or a combination thereof), the system including a processor; a memory coupled with the processor, wherein the processor executes a plurality of modules stored in the memory, and wherein the plurality of modules includes: identifying, by a processor in a first electronic device, a video image from a second electronic device being displayed at a live venue event, wherein the first and second electronic devices are different from each other; capturing, by a processor, the video image being displayed at the live venue on the second electronic from the second electronic device onto the processor of the first electronic device; and sharing the captured the video via social media in real time, at a later date, or a combination thereof.

In certain aspects, the captured video further includes embedded advertisements in the system for sharing video images via social media in real time, at a later date, or a combination thereof.

Also disclosed is a non-transitory computer readable medium embodying a program executable in a computing device for sharing video images via social media (e.g., in real time, at a later date, or a combination thereof), the program including: a program code for identifying a video image from a second electronic device being displayed at a live venue event, wherein the first and second electronic devices are different from each other; a program code for capturing, by a processor, the video image being displayed at the live venue on the second electronic from the second electronic device onto the processor of the first electronic device; and a program code for sharing, by the processor in the first electronic device the captured the video via social media in real time, at a later date, or a combination thereof.

In certain aspects, the non-transitory computer readable medium further includes program code for storing the captured video image before sharing the captured video.

In certain aspects, the non-transitory computer readable medium further includes a program code for simultaneously communicating one or more advertisements with the captured video.

In certain aspects, the non-transitory computer readable medium further includes a program code for embedding one or more advertisements in the captured video and simultaneously communicating the captured video with one or more advertisements via social media (e.g., in real time, at a later date, or a combination thereof).

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIGS. 3A and 3B depict an exemplary interface for registering a user to use the disclosed systems and methods;

DETAILED DESCRIPTION

Figure 1:
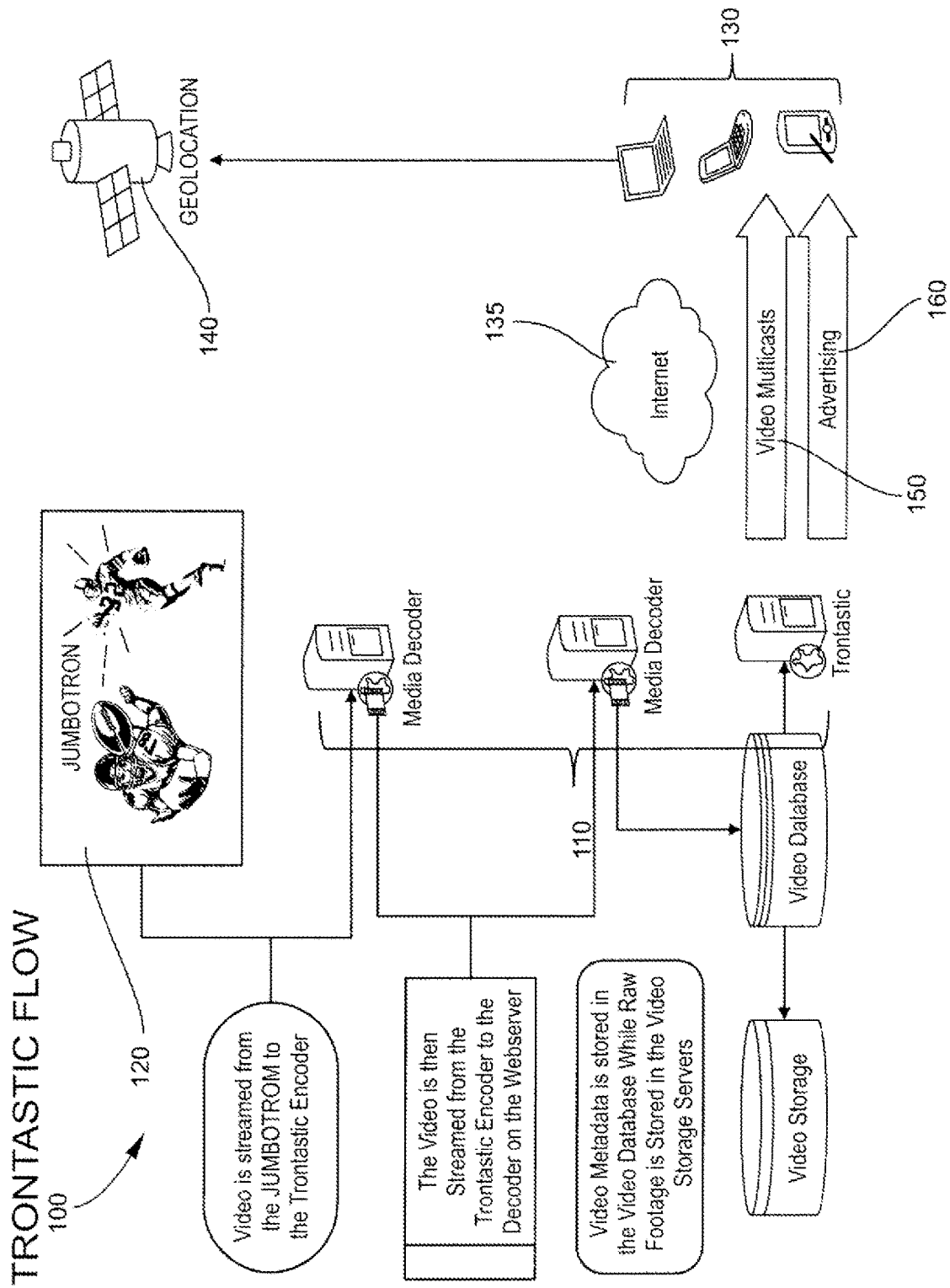
FIG. 1 shows a schematic of the system for capturing and sharing video data via social media according to an embodiment of the invention.
Figure 2:
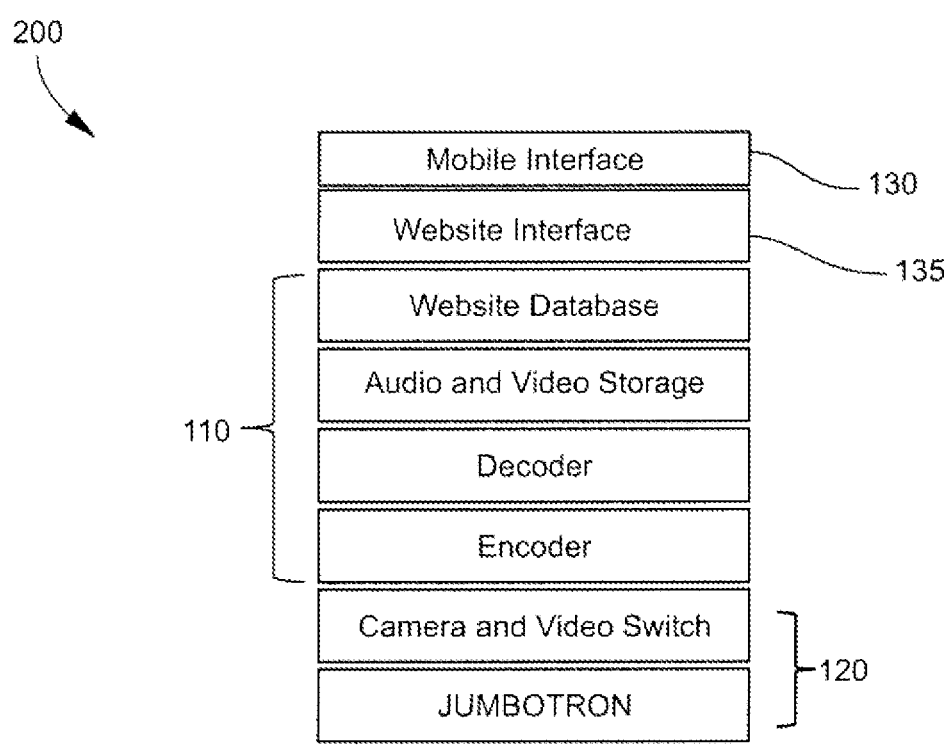
FIG. 2 shows a schematic flow diagram of the system depicted in FIG. 1.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Generally, in terms of hardware architecture for the electronic devices disclosed below, computing device includes a processor, a memory, and one or more input and/or output (I/O) devices (or peripherals) that are communicatively coupled via a local interface. Local interface may be one or more buses or other wired or wireless connections, as is known in the art. Local interface may have additional elements, which are omitted for simplicity, such as controllers, buffers (caches), drivers, transmitters, and receivers to facilitate external communications with other like or dissimilar computing devices. Further, local interface may include address, control, and/or data connections to enable internal communications among the other computer components.

The processor is a hardware device for executing software, particularly software stored in memory. The processor can be any custom made or commercially available processor, such as, for example, a Core series or vPro processor made by Intel Corporation, or a Phenom, Athlon or Sempron processor made by Advanced Micro Devices, Inc. In the case where computing device is a server, the processor may be, for example, a Xeon or Itanium processor from Intel, or an Opteron-series processor from Advanced Micro Devices, Inc. Processor may also represent multiple parallel or distributed processors working in unison.

Memory can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic magnetic, optical, and/or other types of storage media. Memory can have a distributed architecture where various components are situated remote from one another, but are still accessed by processor. These other components may reside on devices located elsewhere on a network or in a cloud arrangement.

The software in memory may include one or more separate programs. The separate programs comprise ordered listings of executable instructions for implementing logical functions. The software in memory may include the system in accordance with the invention, and a suitable operating system (O/S). Examples of suitable commercially available operating systems are Windows operating systems available from Microsoft Corporation, Mac OS X available from Apple Computer, Inc., a Unix operating system from AT&T, or a Unix-derivative such as BSD or Linux. The operating system O/S will depend on the type of computing device. For example, if the computing device is a PDA or handheld computer (e.g., smartphone), the operating system may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system essentially controls the execution of other computer programs, such as the system, and provides scheduling, input-output control, file and data management, memory management, and communication control and related services.

If computing device is an IBM PC compatible computer or the like, the software in memory may further include a basic input output system (BIOS). The BIOS is a set of essential software routines that initialize and test hardware at startup, start operating system, and support the transfer of data among the hardware devices. The BIOS is stored in ROM so that the BIOS can be executed when computing device is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, and Lua. Components of the system may also be written in a proprietary language developed to interact with these known languages.

I/O device may include input devices such as a keyboard, a mouse, a scanner, a microphone, a touch screen, a bar code reader, or an infra-red reader. It may also include output devices such as a printer, a video display, an audio speaker or headphone port or a projector. I/O device may also comprise devices that communicate with inputs or outputs, such as a short-range transceiver (RFID, Bluetooth, etc.), a telephonic interface, a cellular communication port, a router, or other types of network communication equipment. I/O device may be internal to computing device, or may be external and connected wirelessly or via connection cable, such as through a universal serial bus port.

When the computing device is in operation, processor is configured to execute software stored within memory, to communicate data to and from memory, and to generally control operations of computing device pursuant to the software. The system and operating system, in whole or in part, may be read by processor, buffered within processor, and then executed.

In the context of this document, a "computer-readable medium" may be any means that can store, communicate, propagate, or transport data objects for use by or in connection with the system. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system can be embodied in any type of computer-readable medium for use by or in connection with an instruction execution system or apparatus, such as a computer.

For purposes of connecting to other computing devices, computing device is equipped with network communication equipment and circuitry. In a preferred embodiment, the network communication equipment includes a network card such as an Ethernet card, or a wireless connection card. In a preferred network environment, each of the plurality of computing devices on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 300 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

FIGS. 1-6 depict exemplary systems and methods for sharing video images via social media, and more specifically, FIG. 1 shows the system 100 for implementing and sharing video data in real time, at a later date, or a combination thereof via desired social media (e.g., via Facebook, Twitter, Instagram, Trontastic, etc.) according to an embodiment of the invention. For marketing purposes, the disclosed systems and methods may be otherwise known as "Trontastic".

As shown in FIG. 1, the system 100 may include a first electronic device 110 being a computing device with multi-threading processors preferably having (i) broadband connectivity (e.g., no wireless connection in certain aspects), (ii) encoding capabilities including a high quality video capture card and encoding software running on a stable platform (e.g., with a high powered core with multi-threading processors and a minimum of 16 GB of memory), (iii) decoding capabilities in which the encoded signal will be decoded for streaming via a unique identifier to the user (e.g., a third electronic device), (iv) advertising capabilities, and/or any combination thereof; a second electronic device 120 being, for example, an oversized display screen (e.g., a "Jumbotron") and/or a transmitting and receiving device near, on, or in the oversized display screen configured to transmit and receive signals from any of the other devices disclosed herein, these transmitting and receiving devices may include, but are not limited to high quality cameras capable of varied close up and long distance panoramic views capable of communication with, for example, the above mentioned encoder of the first electronic device to capture the footage from the various camera feeds; a third electronic device 130 being a user's peripheral device including, but not limited to a smartphone, a laptop, and a personal digital assistant, which may be configured to directly transmit the video disclosed herein directly to the desired social media of choice; and a fourth electronic device 140 configured to determine the user's location based on global positioning system (GPS), to determine whether the disclosed systems and methods are enabled at the user's location based on their GPS coordinates, transmit data to the desired social media of choice, or any combination thereof.

To utilize the disclosed methods and systems for sharing video images via social media in real time, at a later date, or a combination thereof and as further shown in FIGS. 1 and 3, users are first required to create an account 300 by accessing the website configured to implement the disclosed methods via the web portal 135. As shown in FIG. 3A, when creating an account, the user must enter personal information and answer various questions, including but not limited to, name, email address, password, date of birth, address, nationality, and race (optional) (collectively 301). As further shown in FIGS. 3A and 3B, when creating an account, these additional various questions (collectively 302) may include, but are not limited to, favorite sports, favorite sports teams, favorite live entertainment events other than sports, desired venues, merchandise types typically purchased, whether the user ever uses coupons and what kind(s) if answered yes, whether the systems and methods can forward coupons to the user, whether the systems and methods can forward targeted emails to the user, whether the systems and methods can forward advertisements to the user, user billing information to complete the registration process and enable the users device to implement the disclosed methods and systems, and any combination thereof. In certain aspects, the interface for user registration resembles an operator dashboard in an on-line banking account. Upon completion of the user registration process, the third electronic device 130, for example peripheral device including, but not limited to a smartphone, a laptop, and a personal digital assistant, is now enabled to communicate with the disclosed systems in order to implement the disclosed methods for sharing video images via social media.

Figure 4:
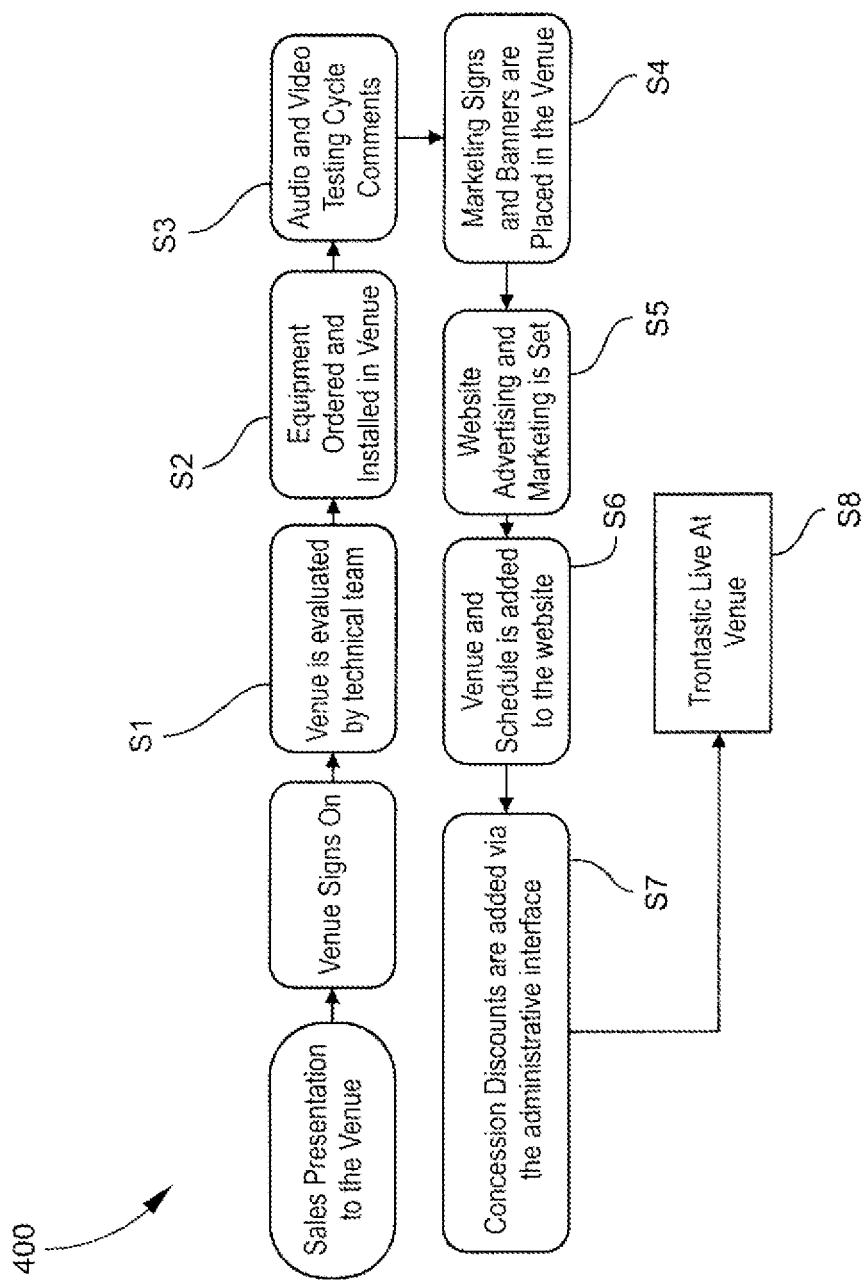
FIG. 4 depicts a flow diagram for installing equipment at a desired venue and implementing the disclosed methods including sharing video data via social media according to an embodiment of the invention.

To further enable the disclosed systems and methods, the second electronic device 120 is equipped with or is retrofitted with a transmitting and receiving device (as disclosed above) configured to communicate with, for example, the first electronic device 110. For example, as depicted in FIG. 4, a particular venue is initially evaluated by a technical team S1. If the venue meets appropriate criteria in order to properly implement the disclosed methods, appropriate equipment is installed at the venue S2, which includes the second electronic device 120 being equipped with or retrofitted with transmitting and receiving device(s) configured to communicate with the first electronic device 110. After installation S2, appropriate audio and video testing commences to ensure that second device 120 properly and optimally communicates with first device 110 S3. During S3, a "test" peripheral device (e.g., third electronic device 130), for example a smartphone, is taken to the venue to ensure that, video may be streamed in real time, at a later date, or a combination thereof from the "test" peripheral device and subsequently to the desired social media. S3 serves as a beta test to determine whether the disclosed system is operable and capable of implementing the disclosed methods after installation at this venue. During S3, optimization is further performed to ensure proper digital media (i.e., video image, advertising image, or a combination thereof) is obtained via devices 110, 130. Once optimization is completed at the venue, marketing indicia S4 may be placed at the venue notifying users that this particular venue is equipped to implement the disclosed methods. Next, appropriate on-line advertising and marketing S5, venue schedule S5, and/or venue discounts S7 may be concurrently or sequentially added on, for example, the first device 110 and the first electronic device 110 is fluffier configured to provide a user's device (i.e., third electronic device 130) access to this information. Next, this particular venue goes "live" S8 such that any user attending an event at this venue will be able implement the disclosed methods and stream video 150 along with optional advertising 160 at this venue via, for example, peripheral devices (i.e., third electronic device 130).

Figure 5:
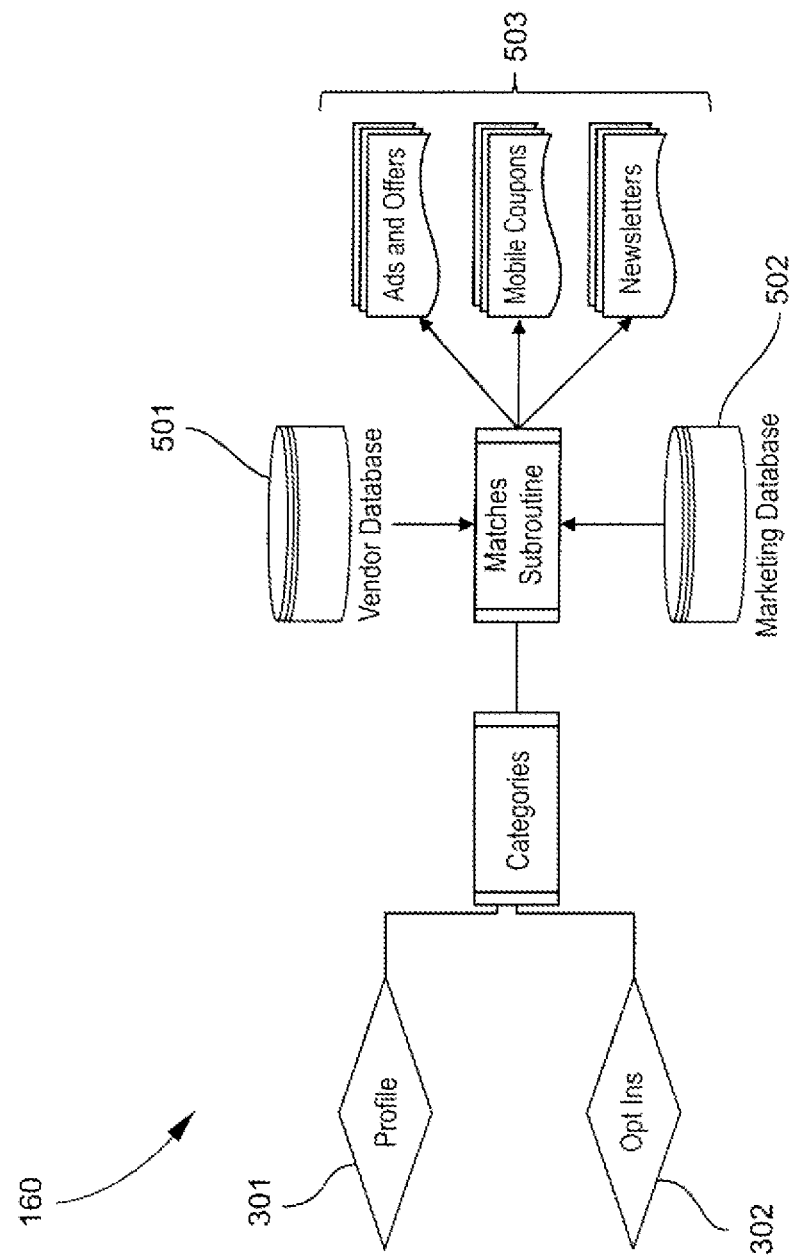
FIG. 5 depicts exemplary selective advertising features that may be included within the disclosed systems and methods.

FIG. 5 depicts an exemplary embodiment demonstrating how a processor in the first electronic device may be further configured to selectively provide advertisements 160 to a user implementing the disclosed systems and methods. These advertisements may include, but are not limited to, coupons, newsletters, limited special offers or any combination thereof (collectively 503), based on the user's answers provided while creating an account/profile 301, 302 as shown in FIGS. 3A and 3B. For example, this embodiment may include a specialized algorithm that will, for example, first Query the specific sports or music categories that the user expressed interest in based on the answers provided during registration in FIGS. 3A and 3B. The Vendor Database 501 is then queried for Specific Tag Phrases that may relate to the specific answers that the user has provided (Band Names, Sports, and Teams etc.) during registration in FIGS. 3A and 3B. The Marketing Database 502 may then be queried against the Vendor Database 501 to see if the vendor or venue has any advertisements, events, coupons, or any combination thereof (collectively 503) that are specific to the user's interests. After querying the Marketing Database 502 against the Vendor Database 501, matches are identified as coupons, newsletters, limited special offers or any combination thereof (collectively 503) that may be stored in the system and/or provided to the user simultaneously while streaming video 150. In certain aspects and in further view of the above disclosures, the user may receive targeted advertising based on questions that they answered when they submitted their profile and based on the geographic location of the venue of the event they are attending. In certain aspects and in further view of the above disclosures, the venue may offer discounted mobile, electronic coupons for souvenir and food and beverage items at the venue that the user can have scanned to receive the discount on the item they are purchasing. Alternatively, other options such as free door prizes may be provided for users who show they have a portion of the system that implements the disclosed methods. Vendors participating in the disclosed systems and methods may preferably participate in these systems and methods by paying the operator of the system a specified, contractually agreed upon amount or by paying a percentage of generated revenue (e.g., a royalty) to the operator.

Figure 6:
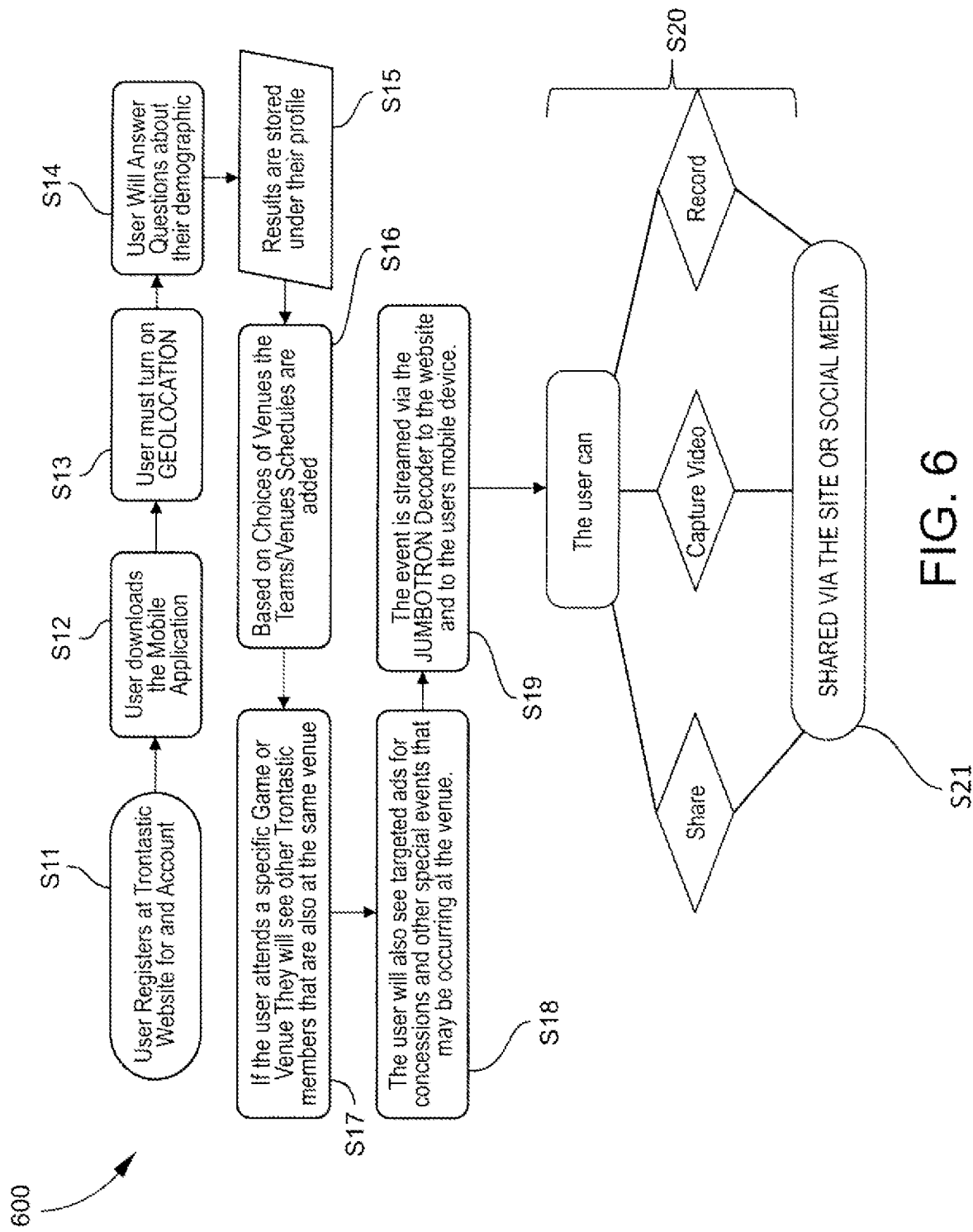
FIG. 6 depicts a schematic representation for users implementing the methods for sharing video data in real time via social media according to an embodiment of the invention.

In view of FIGS. 1 and 6, the disclosed methods and systems may be used when a user signs in via a peripheral device 130 to a website hosted by, for example, a computing device 110 having multi-threading processors with broadband connectivity S11, S12. For example, computing device 110 will consist of a network of front end web servers used to provide the actual static and dynamic pages built with a responsive view for mobile devices that will allow users to download or bookmark an application for implementing the disclosed methods on their mobile device.

After signing in, the user's geolocation is determined S13 by, for example, fourth electronic device 140. In certain aspects, the user may be prompted to answer questions or may have previously answered questions about various demographics S14, which aids, in determining (i) whether and (ii) what kinds of selective advertisements 160 may be sent to the user's peripheral device 130, S15-S16. The user's device then receives information regarding whether the current venue is configured to implement the systems and methods for sharing video images via social media. If it is determined that the current venue is compliant and configured to implement the disclosed systems and methods, information may then be sent to the user's peripheral device 130 identifying other users of the disclosed systems and methods at the same venue S17. S18 and S19 may occur sequentially or simultaneously in which the user may see targeted advertisements 160 and/or desired video 150 via the peripheral device 130. In certain aspects, video will be streamed from the venue via a unique identifier for the stream, which will be stored in a dynamic library in a database with the actual stream being captured into the network storage on computing device 130.

With regard to video 150, the user may share, capture video, or record S20 the streamed video, and may ultimately share this via desired social media S21 in real time, at a later date if desired, or any combination thereof. The disclosed methods and systems advantageously allow users to capture specific and potentially life changing/memorable moments occurring while attending these sporting and/or other above-mentioned events. For example, people attending sporting and other above-mentioned events never know when their image will be shown on, for example, a Jumbotron. These methods and systems allow a user attending a venue to not only capture such a moment but also to share this moment with friends and family via social media. In addition to the previously mentioned advantages, the disclosed systems and methods also allow the user to receive targeted advertisements and coupons that may provide additional value via discounts while attending these events, such advertisements and coupons may also concurrently generate increased revenue for vendors. In certain aspects, the technology will continue to evolve to provide other types of offers and provide other avenues for advertising and marketing.

Also disclosed is a non-transitory computer readable medium embodying a program executable in a computing device for sharing video images via social media in real time, at a later date, or a combination thereof, the program including: a program code for identifying a video image from a second electronic device being displayed at a live venue event, wherein the first and second electronic devices are different from each other; a program code for capturing, by a processor, the video image being displayed at the live venue on the second electronic from the second electronic device onto the processor of the first electronic device; and a program code for sharing, by the processor in the first electronic device, the captured the video via social media in real time, at a later date, or a combination thereof.

In certain aspects, the non-transitory computer readable medium further includes program code for storing the captured video image before the captured video is shared.

In certain aspects, the non-transitory computer readable medium further includes a program code for simultaneously communicating one or more advertisements with the captured video.

In certain aspects, the non-transitory computer readable medium further includes a program code for embedding one or more advertisements in the captured video and simultaneously communicating the captured video with one or more advertisements via social media in real time.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A system for capturing and sharing video images via social media, the system comprising:
   (a) a processor in a first electronic device that identifies an image displayed on the second electronic device, wherein the first electronic device includes a transmitting device linked to a second electronic device and configured to communicate with a third electronic device;
   (b) the first electronic device captures an image displayed on the second electronic device to form a captured image while the second electronic device provides the captured image with a unique identifier;
   (c) the third electronic device communicates with the first electronic device by downloading and installing an application, wherein the third electronic device comprises a peripheral device;
   (d) creating, with the third electronic device, a user account via the application by providing information comprising a name, email address, password, date of birth, address, nationality or any combination thereof and optionally a sports teams, entertainment events other than sports, desired venues, merchandise types typically purchased, whether the user ever uses coupons and what kind if answered yes, whether the system can forward coupons to the user, whether the system can forward targeted emails to the user, whether the system can forward advertisements to the user, and/or user billing information;
   (e) the first electronic device receives and communicates the captured image with the unique identifier to the third electronic device; and
   (f) the third electronic device is configured to share the captured image of step (e) via social media as desired.

2. The system of claim 1, wherein the third electronic device shares the captured image of (e) with a fourth electronic device that shares the image via social media in real time, at a later date, or a combination thereof, wherein the fourth electronic device is different than the first, second, and third electronic devices.

3. The system of claim 1, wherein additional digital content is added to the captured video image of (b) or (e).

4. The system of claim 3, wherein the additional digital content is at least one advertisement embedded within the captured image provided by a licensed third party vendor.

5. The system of claim 4, wherein additional digital content is added in real time to the captured video image of (b) or (e).

6. The system of claim 1, wherein the third electronic device is a smartphone.

7. The system of claim 6, wherein the system determines geolocation of the third electronic device relative to the transmitting device of the first electronic device by a global positioning system in operable communication with the first and third electronic devices, and
   selectively determines the advertisement to be embedded based on geolocation of the third electronic device.

\* \* \* \* \*